Dec. 29, 1959  F. TSCHAPPU  2,919,405
POWER MEASURING INSTRUMENT
Filed July 26, 1955
Fig. 1.
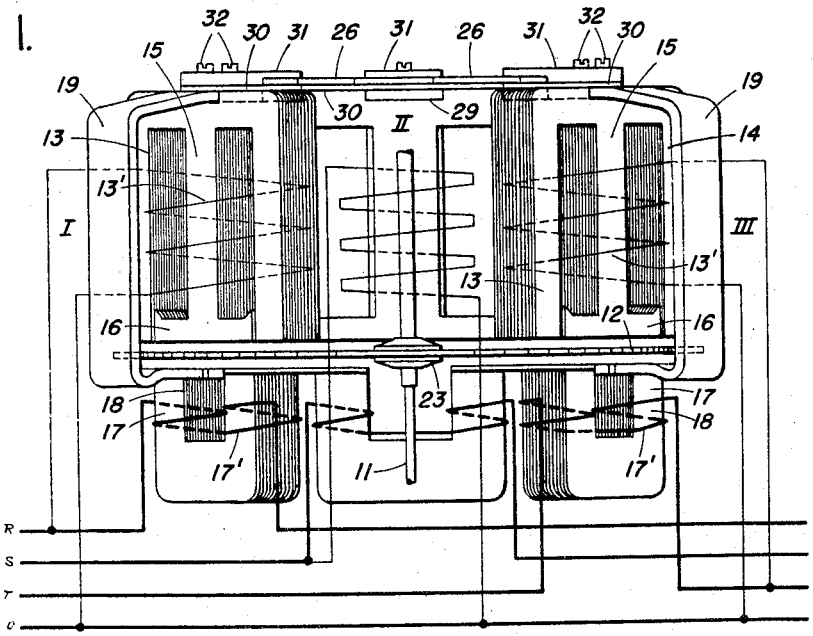
Fig. 3.
Fig. 2.
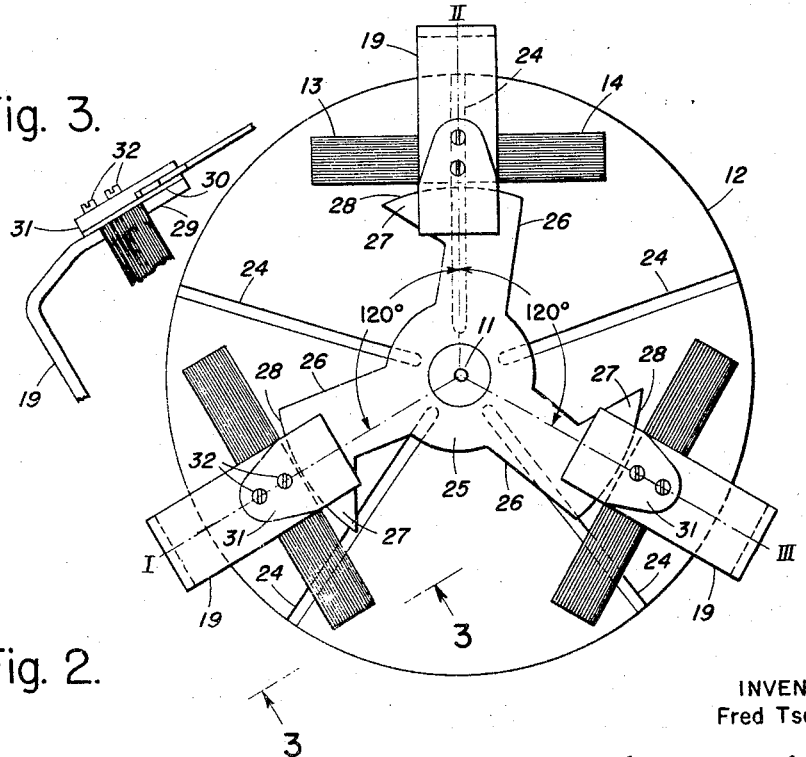
INVENTOR
Fred Tschappu
*Morgan, Finnegan, Durham & Pine*
ATTORNEYS

United States Patent Office 2,919,405
Patented Dec. 29, 1959

2,919,405

POWER MEASURING INSTRUMENT

Fred Tschappu, Zug, Switzerland, assignor to Landis & Gyr, A.G., Zug, Switzerland, a body corporate of the Confederation of Switzerland Application July 26, 1955, Serial No. 524,387

Claims priority, application Switzerland July 27, 1954

4 Claims. (Cl. 324—107)

This invention relates to power measuring systems and more specifically to an improved wattmeter that is particularly useful for measuring power consumed in a polyphase alternating current power supply system.

Objects and advantages of the invention will be set forth in part hereinafter and in part will be obvious herefrom, or may be learned by practice with the invention, the same being realized and attained by means of the methods, instrumentalities and combinations pointed out in the appended claims.

The invention consists in the novel parts, constructions, arrangements, combinations and improvements herein shown and described.

The accompanying drawings referred to herein and constituting a part hereof, illustrate one embodiment of the invention and together with the description serve to explain the principles of the invention.

Of the drawings:

Fig. 1 is a side elevation of the operating elements of a wattmeter in accordance with the invention with certain portions thereof in diagrammatic form;

Fig. 2 is a top view of the apparatus shown in Fig. 1; and

Fig. 3 is a fragmentary view of Fig. 2 taken along the line 3—3 thereof.

Numerous efforts have been made to provide a reasonably compact, simple and low cost meter for the measurement of power in polyphase systems, but the attainment of these ends have resulted in substantial inaccuracies and increased manufacturing difficulties that render such design unsatisfactory. Present three-phase meters generally use three individual rotary discs and consequently require a relatively large housing. Efforts to reduce the size of the meter through the utilization of a single disc responsive to voltage and current fluxes of the three phases has resulted in interference between the several magnetic fields that adversely affected the accuracy of the measurement and could not be satisfactorily eliminated. For instance, in meters such as the Aron meter in which the two driving systems are arranged in diametrically opposite positions on the disc and meters utilizing diametrically disposed driving systems with a third driving system situated centrally of the disc the mutual interference of the voltage and current fluxes and the interference between the stray voltage and current fluxes produced an asynchronous affect on the rotary disc resulting in substantial recording errors.

The above situation is further complicated by the fact that known polyphase wattmeters require relatively large yoke shaped magnets for braking purposes or relatively expensive magnets with special mounting features to facilitate their adjustment relative to the driving elements and to enable their insertion and removal without modifying their adjustment. In either case this need for braking places an additional premium on space so that any space-saving technique such as that involved in using a single disc takes on added significance provided the space-saving technique does not introduce prohibitive errors.

While rotary field errors in single disc polyphase meters have been partially overcome by the utilization of slotted aluminum discs cemented one to the other with the slots in staggered relationship, considerable inaccuracies still remained throughout the normal load range and particularly at very small and very large loads.

Accordingly one object of the invention resides in the provision of an improved wattmeter that overcomes disadvantages of prior meters and is characterized by its simplicity, accuracy, dependability, relatively low cost and ease of adjustment. With this invention uniform distribution and diversion of the stray fluxes away from the driving disc by use of an improved magnetic linkage between the several phases, enables the attainment of improved compensation of the stray fluxes as compared with the arbitrary compensation heretofore obtained.

More specifically the meter in accordance with the invention utilizes a symmetrical arrangement of three driving systems, each having a potential and current coil, about a single disc with the coils spaced at 120 degrees, one relative to the others. The potential coils are all positioned on one side of the disc while the current coils are positioned on the opposite side of the disc and in line with their respective potential coils. The three driving systems are coupled one to the other by means of an improved compensation sheet of magnetic material arranged to cooperate with the potential coils. By properly shaping the compensation sheet and providing for its adjustment relative to the potential coils precise and accurate compensation for the stray fluxes can be accomplished.

A preferred embodiment of the invention is illustrated in the several figures for use on a four wire three phase electrical system. The three driving systems denoted by I, II and III each include a potential coil having an E-shaped core with vertically disposed legs 13, 14 and 15 and a current coil having vertically disposed legs 17 and 18. The windings for both the potential and current coils are illustrated in diagrammatic form for purposes of clarification and are denoted by the numerals 13′ and 17′ respectively. In addition the supporting frame for the illustrated elements of the wattmeter and the braking system, being well-known in the art, have been omitted for convenience and ease of understanding the invention.

The four conductors of the distribution system are denoted by the letters R, S, T and O with the conductor O being the neutral or common conductor. The driving system I has its potential coil connected between the conductors R and O and its associated current coil connected in series with the conductor R. Driving systems II and III are similarly interconnected with the conductors S and O and T and O respectively. It will also be observed that the center pole 15 of each of the potential coils is provided with an elongated pole piece 16 extending into close proximity with the outer legs 13 and 14 to form a small air gap therebetween. The length of the center pole piece 16 is approximately the same as the distance between the outer edges of the legs 17 and 18 of the current coil core. The cores for the several coils are laminated and the pole faces of associated current and potential coils are in spaced relationship to accommodate the disc 12 disposed therebetween. The disc is supported on a rotatably mounted shaft 11 by means of a suitable central hub 23.

A voltage counter pole is provided for each driving system and constitutes a generally U-shaped member 19 of iron or other magnetic material having the upper leg secured to the upper side of a voltage coil and the lower leg extending beneath the disc 12 and generally in a plane with the pole faces of the associated current coil. The lower leg of each U-shaped member 19 is preferably tapered to provide a pole piece of narrowed section.

The several coils do not require special configuration but may be made in any desirable size or shape depending upon space available. Through the disposition of the driving signals at angles of 120 degrees one relative to the other sufficient space is available between the several coils which facilitates a wide range in choice of designs.

The driving disc 12 is preferably formed of a plurality of thin sheets of aluminum foil cemented one to the other in insulated relationship. Each foil layer is provided with radial slots with the slots of each layer being staggered regularly with respect to the other layers. In the case of a disc formed of six layers of aluminum foil each having five equally disposed slots the angle between adjoining slots of two contiguous foils is approximately 12 degrees. The utilization of a disc structure of this character reduces disc currents and avoids many of the difficulties encountered with other types of disc structures.

In order to compensate for variations in the rotary field produced by the mutual linkage of stray voltage fluxes of the three separate driving systems a compensation sheet is provided having a circular center portion 25 and three outwardly extending arms 26 spaced at angles of 120 degrees one relative to the other. Each arm has a lateral lobe or extending portion 27 generally triangular in shape and having a curved outer edge with all points substantially equal distance from the center of the central member 25. The compensation sheet is held in position by a clamp assembly associated with each potential coil and shown generally in Fig. 3. It will be observed that the upper leg of the magnetic U-shaped member 19 extends through a cooperating slot in the top side of the core of the voltage coil and extends somewhat beyond the inner edge of the core to form an inner portion 29. In order to magnetically insulate each arm 26 from its associated potential coil a brass plate 30 is positioned in overlying relationship with the leg part 29 of the magnetic member 19 and the outer end of the arm 26 rests on this plate 30. A flange 31 of brass or other nonmagnetic material overlies the arm 26. This flange member 31 and the plate 30 are held in position on the leg part 29 of magnetic member 19 by a pair of screws 32. With this structure the compensation sheet 25, 26 can be rotated relative to the potential coils by loosening screws 32 and once the proper position is selected the screws 32 can be tightened to permanently secure it in position.

Stray flux effects on the rotary field at small loads are caused by the interaction of the voltage driving fluxes of the several potential coils. These fluxes are neutralized by the proper adjustment of the compensation sheet which alters the magnitude of the interaction and thus the magnitude of its interference with the proper operation of the meter. It is thus desirable to arrange the compensation sheet as far away from the driving disc 12 as possible in order to divert the voltage fluxes and thereby prevent voltage driving fluxes from harmfully interacting with currents in the driving disc. Proper adjustment of the compensation sheet or element to produce the proper magnetic coupling between the potential coils is accomplished by rotating the arms of the sheet 26 more or less deeply into the grooves. It has been found that a relatively flat coupling characteristic is attained by magnetically insulating the arms as described in the preceding paragraph thus providing accurate and dependable compensation over a wide load range.

While only one embodiment of the invention has been shown and described, it is apparent that other modifications, alterations and changes may be made without departing from the true scope and spirit thereof.

What is claimed is:

1. In a polyphase induction type watthour meter comprising a rotary disc having a plurality of segments, three driving means disposed about said disc each having a potential coil and core therefor on one side of said disc and a current coil and core therefor on the other side thereof, means for compensating said meter for variations in the rotary field produced by the mutual linkage of stray voltage fluxes of said driving means comprising a substantially flat rotatable compensation member of magnetic material disposed in a plane parallel to said disc and having three equally spaced extensions which project to regions adjacent the edges of said potential cores which are at maximum distances from said disc, said extensions including tapered sections which are transverse to the directions in which said extensions project, and non-magnetic clamping means on the core of each potential coil for releasably holding said tapered sections in position relative to the last said cores.

2. A device according to claim 1, in which said rotatable compensation member is coaxial with said rotary disc.

3. A device according to claim 1, in which the peripheries of said tapered sections are substantially arcuate in shape.

4. Apparatus according to claim 1, in which said non-magnetic clamping means comprises a plurality of brass members mounted on each potential core and overlapping the associated tapered section for releasably holding the same relative to said core.

References Cited in the file of this patent

UNITED STATES PATENTS

| 2,129,010 | Kurz | Sept. 6, 1938 |
| 2,134,575 | Pratt | Oct. 25, 1938 |

FOREIGN PATENTS

| 239,546 | Great Britain | Jan. 7, 1926 |
| 433,362 | Germany | Aug. 27, 1926 |